US011888277B2

(12) United States Patent
Wi et al.

(10) Patent No.: US 11,888,277 B2
(45) Date of Patent: Jan. 30, 2024

(54) TERMINAL AND ELECTRIC CABLE INCLUDING TERMINAL

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP); TOYOTA JIDOSHA KABUSHIKI KAISHA, Toyota (JP)

(72) Inventors: Nungna Wi, Yokkaichi (JP); Masaaki Tabata, Yokkaichi (JP); Hajime Matsui, Yokkaichi (JP); Shunya Takeuchi, Yokkaichi (JP); Hiroshi Kobayashi, Okazaki (JP); Takeshi Amakawa, Toyota (JP)

(73) Assignees: AUTONETWORKS TECHNOLOGIES, LIMITED, Mie (JP); SUMITOMO WIRING SYSTEMS, LIMITED, Mie (JP); SUMITOMO ELECTRIC INDUSTRIES, LIMITED, Osaka (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 105 days.

(21) Appl. No.: 17/626,968

(22) PCT Filed: Jun. 29, 2020

(86) PCT No.: PCT/JP2020/025480

§ 371 (c)(1),
(2) Date: Jan. 13, 2022

(87) PCT Pub. No.: WO2021/010148

PCT Pub. Date: Jan. 21, 2021

(65) Prior Publication Data

US 2022/0368040 A1 Nov. 17, 2022

(30) Foreign Application Priority Data

Jul. 18, 2019 (JP) ................................ 2019-132787

(51) Int. Cl.
*H01R 4/50* (2006.01)

(52) U.S. Cl.
CPC ......... *H01R 4/5083* (2013.01); *H01R 4/5075* (2013.01)

(58) Field of Classification Search
CPC ...... H01R 4/50; H01R 4/5008; H01R 4/5016; H01R 4/5025; H01R 4/5041; H01R 4/505; H01R 4/5075; H01R 4/5083
See application file for complete search history.

(56) References Cited

U.S. PATENT DOCUMENTS 2,959,766 A 11/1960 Jacobsen
4,508,409 A * 4/1985 Cherry ................ H01R 4/2491 403/311

(Continued)

FOREIGN PATENT DOCUMENTS

CN 105428870 A 3/2016
JP S15-85 Y1 1/1940

(Continued)

OTHER PUBLICATIONS

Sep. 15, 2020 International Search Report issued in International Patent Application No. PCT/JP2020/025480.

*Primary Examiner* — Ross N Gushi
(74) *Attorney, Agent, or Firm* — Oliff PLC

(57) ABSTRACT

A terminal to be coupled to a front end portion of an electric wire. The terminal includes a terminal body and a slider. The terminal body includes a holding section holding a core wire of the electric wire. The slider is movable in a front-rear direction between a first position and a second position that is on a front side with respect to the first position while the (Continued)

slider being fitted on a section of the terminal body including the holding section. The slider includes a pressing portion that presses the holding section toward the electric wire when the slider is at the second position. The slider includes a pressure receiving portion that is pushed from a rear side to move the slider from the first position to the second position. The slider includes a support portion that receives a force applied to the pressure receiving portion that is pushed.

6 Claims, 5 Drawing Sheets

(56) References Cited

U.S. PATENT DOCUMENTS

| | | | | |
|---|---|---|---|---|
| 6,729,895 | B1 | 5/2004 | Bryan | |
| 7,160,156 | B2 * | 1/2007 | Holliday .............. | H01R 4/5025 439/879 |
| 7,306,495 | B2 | 12/2007 | Hashimoto et al. | |
| 9,490,563 | B2 | 11/2016 | Shinmi | |
| 2006/0035538 | A1 | 2/2006 | Suemitsu et al. | |
| 2016/0079686 | A1 | 3/2016 | Shinmi | |

FOREIGN PATENT DOCUMENTS

| | | | |
|---|---|---|---|
| JP | S54-34225 | Y2 | 10/1979 |
| JP | 2005-50736 | A | 2/2005 |
| JP | 2006-54166 | A | 2/2006 |

* cited by examiner

TERMINAL AND ELECTRIC CABLE INCLUDING TERMINAL

TECHNICAL FIELD

The present disclosure relates to a terminal and an electric cable including a terminal.

The technology described herein relates to a coupling structure of coupling a terminal to an electric wire.

BACKGROUND ART

A known electric cable includes a core wire exposed at an end of the electric cable and a terminal coupled to the core wire. The terminal may include a crimping portion that is crimped on a section of the core wire that is exposed at the end of the electric cable.

To crimp the terminal on the core wire, the following steps may be performed. A sheet metal is pressed into a predefined shape to prepare the terminal. The terminal is placed on a lower die of dies that are movable relative to each other in the vertical direction. The section of the core wire exposed at the end of the electric cable is placed on the crimping portion of the terminal. The one of the dies or both dies are moved closer to each other. The crimping portion of the terminal is crimped on the section of the core wire by pressing the crimping portion of the terminal with a crimping portion of the upper die and a placing portion of the lower die. Through these steps, the terminal is coupled to the end section of the electric wire (see Patent Document 1).

RELATED ART DOCUMENT

Patent Document

[Patent Document 1]
Japanese Unexamined Patent Application Publication No. 2005-50736

SUMMARY OF THE INVENTION

Problem to be Solved by the Invention

With the core wire being sandwiched by and connected to the terminal instead of using the above crimping portion, two components including a terminal body and a slider that is disposed behind the terminal body may configure the terminal. In such a configuration, the slider may be deformed by a force applied to the slider when the slider is pushed and slid.

The technology described herein was made in view of the above circumstances. An object is to provide a terminal including a slider that is less likely to be deformed.

Means for Solving the Problem

The present disclosure relates to a terminal to be coupled to a front end portion of an electric wire. The terminal includes a terminal body and a slider. The terminal body includes a holding section holding a core wire of the electric wire. The slider is movable in a front-rear direction between a first position and a second position that is on a front side with respect to the first position while the slider being fitted on a section of the terminal body including the holding section. The slider includes a pressing portion that presses the holding section toward the electric wire when the slider is at the second position. The slider includes a pressure receiving portion that is pushed from a rear side to move the slider from the first position to the second position. The slider includes a support portion that receives a force applied to the pressure receiving portion that is pushed.

Advantageous Effects of Invention

According to the present disclosure, the terminal is less likely to be deformed.

MODES FOR CARRYING OUT THE INVENTION

Figure 1:
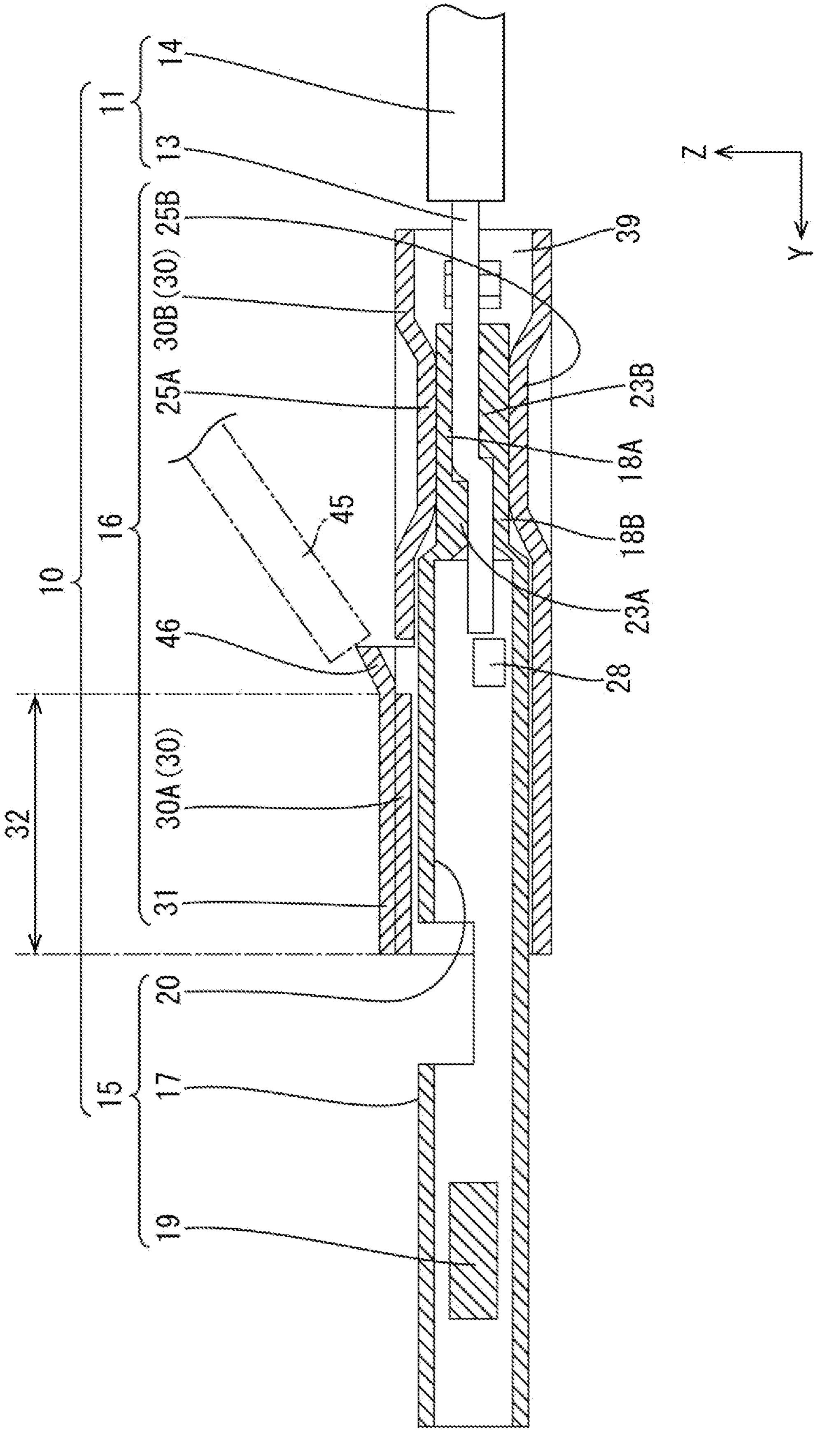
FIG. 1 is a cross-sectional view of an electric cable including a terminal according to a first embodiment.

Description of Embodiments According to the Present Disclosure

First, embodiments according to the present disclosure will be listed and described.

(1) The present disclosure relates to a terminal to be coupled to a front end portion of an electric wire. The terminal includes a terminal body and a slider. The terminal body includes a holding section holding a core wire of the electric wire. The slider is movable in a front-rear direction between a first position and a second position that is on a front side with respect to the first position while the slider being fitted on a section of the terminal body including the holding section. The slider includes a pressing portion that presses the holding section toward the electric wire when the slider is at the second position. The slider includes a pressure receiving portion that is pushed from a rear side to move the slider from the first position to the second position. The slider includes a support portion that receives a force applied to the pressure receiving portion that is pushed.

When a force is applied to the pressure receiving portion and the slider moves from the first position to the second position, the holding section is pressed by the pressing portion toward the electric wire. The holding section is electrically connected to the electric wire and the terminal is electrically connected to the electric wire.

The support portion receives the force that is applied to the pressure receiving portion when the pressure receiving portion is pushed from the rear side. This suppresses the slider from being deformed.

(2) The slider may further include an auxiliary support portion that receives the force received by the support portion from the pressure receiving portion.

The force that is received by the support portion is further received by the auxiliary support portion. This further suppresses the slider from being deformed.

(3) The pressure receiving portion may be in a middle of the slider with respect to the front-rear direction.

If the pressure receiving portion is on the front end portion or the rear end portion of the slider and receives a force, the front end portion or the rear end portion of the slider may be bent and lifted up. Since the pressure receiving portion is in the middle of the slider in the front-rear direction, the front end portion or the rear end portion of the slider 16 is less likely to be bent and lifted up.

(4) The slider may include an overlapping area in which walls of the slider overlap and the pressure receiving portion may be behind the overlapping area.

Since the pressure receiving portion is behind the overlapping area in which the walls overlap, the thickness of the walls that are in the overlapping area can be used for a contact portion of the pressure receiving portion. This increases a contact area of the pressure receiving portion and improves work efficiency of pushing the slider.

(5) The pressure receiving portion may be adjacent to the pressing portion.

The force applied to the pressure receiving portion is effectively transferred to the pressing portion that is adjacent to the pressure receiving portion. The pressing portion presses the holding section effectively and this improves electric connection reliability between the holding section and the electric wire.

(6) The present disclosure is related to an electric cable including a terminal. The electric cable including the terminal includes the terminal according to any one of (1) to (5) and an electric wire coupled to the terminal.

Detail of Embodiment According to the Present Disclosure

Embodiments according to the present disclosure will be described. The present invention is not limited to the embodiments. All modifications within and equivalent to the technical scope of the claimed invention may be included in the technical scope of the present invention.

First Embodiment

A first embodiment according to the present disclosure will be described with reference to FIGS. 1 to 3. An electric cable 10 including a terminal according to this embodiment includes a terminal 12 and an electric wire 11 to which the terminal 12 is coupled. The terminal 12 is to be coupled to a mate terminal, which is not illustrated. As illustrated in FIG. 1, the terminal 12 is coupled to a front end portion of the electric wire 11 in an extending direction (in a direction that is pointed by a Y arrow) in which the electric wire 11 extends. In the following description, it is considered that an Z arrow, the Y arrow, and an X arrow in the drawing point the upper side the front side, and the left side, respectively. Regarding components having the same configuration, some of the components may be indicated by reference signs and others may not be indicated by the reference signs.

[Electric Wire 11]

As illustrated in FIG. 1, the electric wire 11 extends in the front-rear direction. The electric wire 11 includes a core wire 13 and an insulating sheath 14 that covers an outer surface of the core wire 13. The insulating sheath 14 is made of synthetic resin having insulating properties. The core wire 13 in this embodiment is a single core wire including only one metal wire. Alternatively, a twisted wire including multiple metal fine wires that are twisted together may be used for the core wire 13. The metal of which the metal wire is made may be selected from any kinds of meatal including copper, copper alloy, aluminum, and aluminum alloy where appropriate. The core wire 13 in this embodiment may be made of copper or copper alloy.

[Terminal 12]

Figure 2:
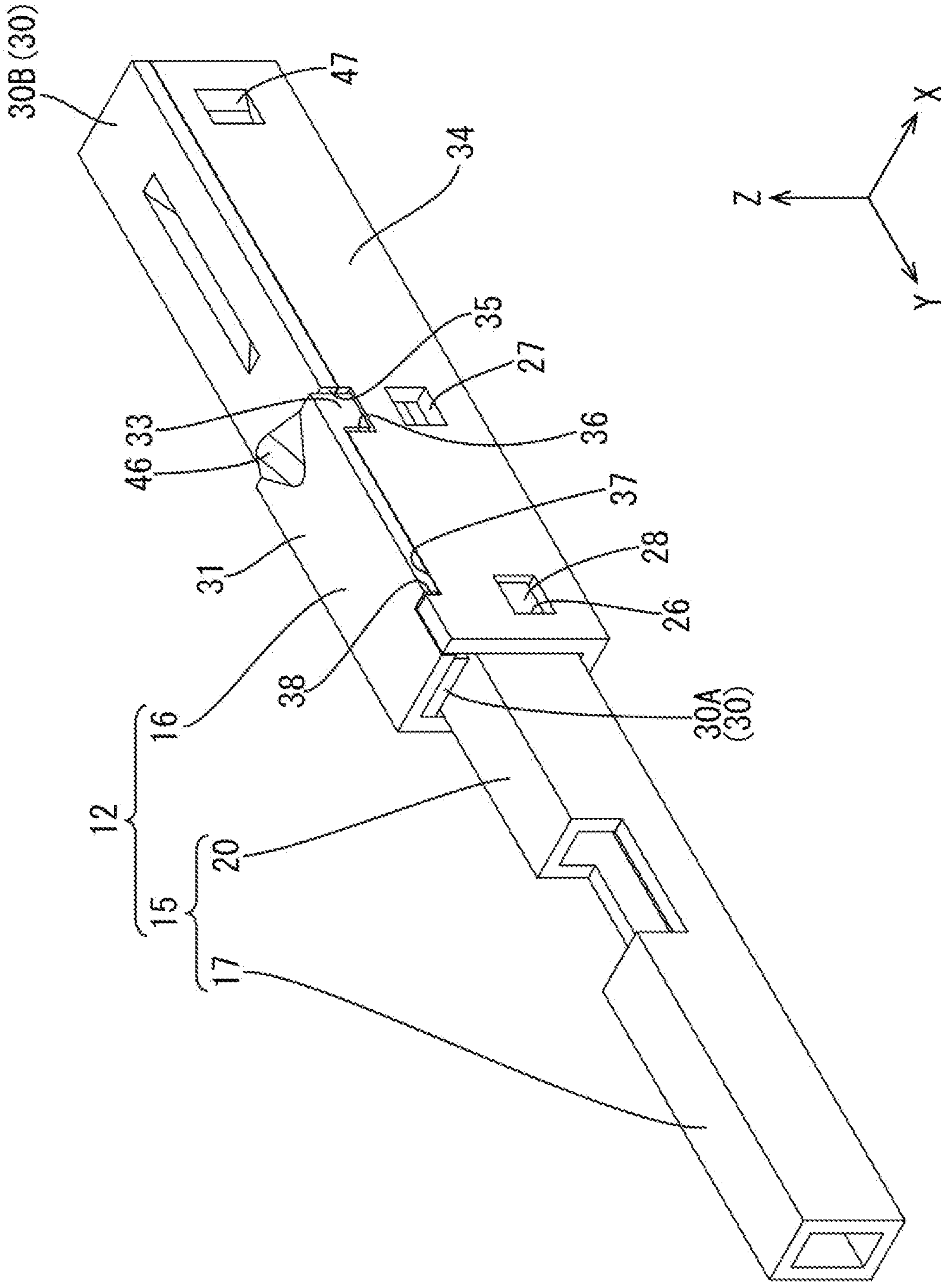
FIG. 2 is a perspective view of the terminal.

As illustrated in FIG. 2, the terminal 12 includes a terminal body 15 and a slider 16. The terminal body 15 is made of metal. The slider 16 is slidable relative to the terminal body 15.

[Terminal Body 15]

The terminal body 15 is formed into a predetermined shape by a known method including pressing, cutting, and casting. The metal of which the terminal body 15 is made may be selected from any kinds of metal including copper, copper alloy, aluminum, aluminum alloy, and stainless steel where appropriate. The terminal body 15 in this embodiment may be made of copper or copper alloy. Surfaces of the terminal body 15 may be plated. The plating metal may be selected from any kinds of metal such as tin, nickel, and silver where appropriate. The terminal body 15 in this embodiment is tin-plated.

As illustrated in FIG. 2, the terminal body 15 includes a tubular portion 17 and a wire coupling portion 20. A mate terminal, which is a plate member, is inserted into the tubular portion 17. The wire coupling portion 20 is behind the tubular portion 17 and coupled to the electric wire 11. As illustrated in FIG. 3, the wire coupling portion 20 includes an upper holding section 18A and a lower holding section 18B that extend rearward. The terminal 12 of this embodiment is a so-called female terminal and the mate terminal is a so-called male terminal.

Figure 3:
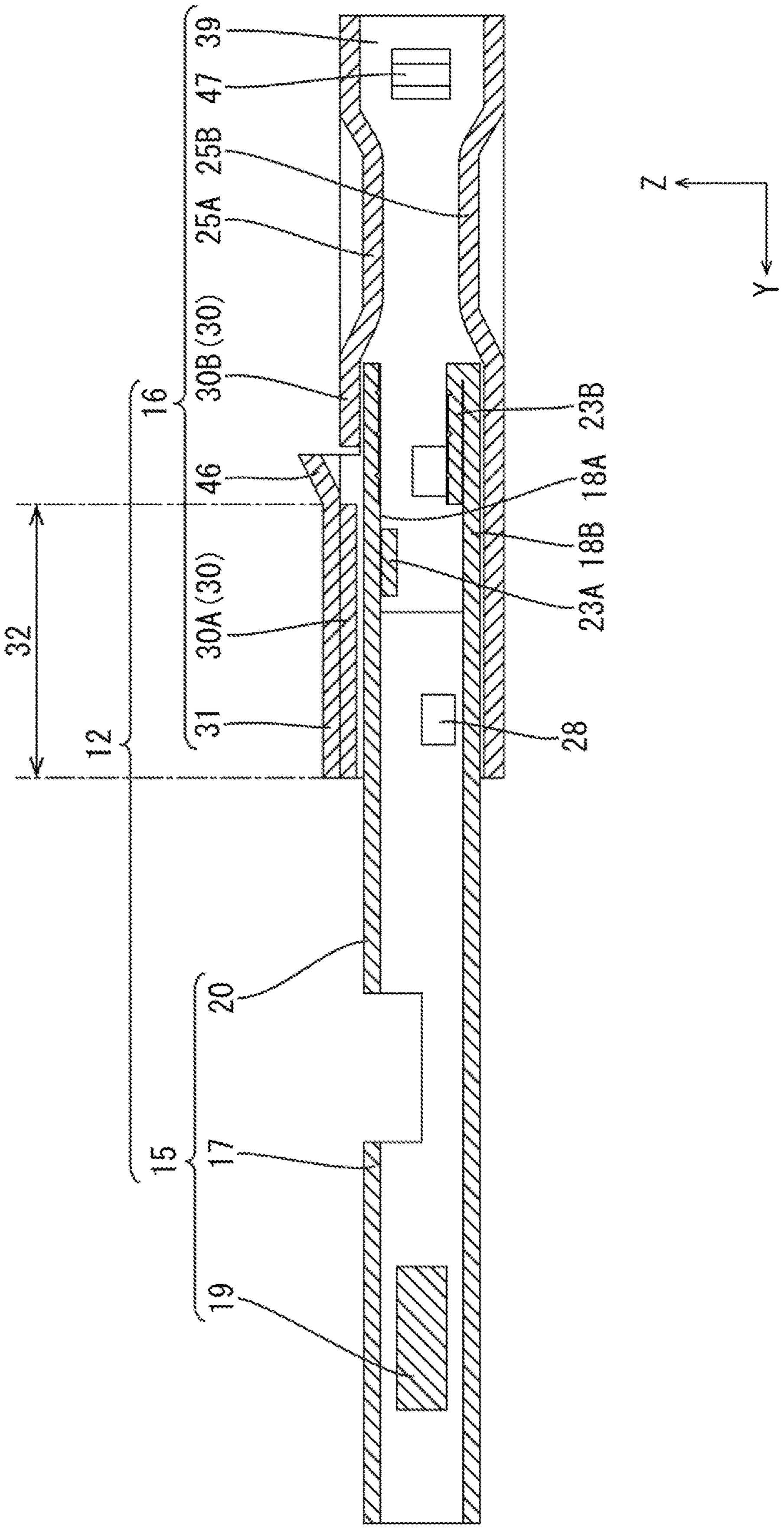
FIG. 3 is a cross-sectional view of the terminal.

As illustrated in FIG. 3, the tubular portion 17 has a rectangular tubular shape and extends in the front-rear direction. The tubular portion 17 has an opening at the front end and the male terminal is inserted through the opening. An elastic contact tab 19 that is elastically deformable is within the tubular portion 17 and projects inward from an inner wall of the tubular portion 17. When the mate terminal is inserted in the tubular portion 17, the mate terminal presses and elastically deforms the elastic contact tab 19. The mate terminal is held between the inner wall of the tubular portion 17 and the elastic contact tab 19 by a resilient force of the elastic contact tab 19 that is elastically deformed. The terminal 12 is electrically connected to the mate terminal.

As illustrated in FIG. 3, the wire coupling portion 20 is behind the tubular portion 17. The wire coupling portion 20 has a rectangular tubular shape. As illustrated in FIG. 3, the upper holding section 18A (an example of a holding section) projects rearward from a rear end portion of an upper wall of the wire coupling portion 20. The lower holding section 18B (an example of the holding section) projects rearward from a rear end portion of a lower wall of the wire coupling portion 20. The upper holding section 18A and the lower holding section 18B have elongated shapes extending in the front-rear direction. Lengths of the upper holding section 18A and the lower holding section 18B measuring in the front-rear direction are about equal to each other.

An upper holding protrusion 23A protrudes downward from a section of a lower surface of the upper holding section 18A in front of a rear edge of the upper holding section 18A. A lower holding protrusion 23B protrudes upward from a section of an upper surface of a rear edge of the lower holding section 18B. The lower holding protrusion 23B is displaced from the upper holding protrusion 23A in the front-rear direction.

A lower surface of the upper holding section 18A and an upper surface of the lower holding section 18B dig into an oxide layer formed on the surface of the core wire 13 and locally strip the oxide layer so that the metal surface of the core wire 13 is exposed. With the metal surface contacting the upper holding section 18A and the lower holding section 18B, the core wire 13 is electrically connected to the terminal body 15.

As illustrated in FIG. 1, the sidewalls of the terminal body 15 include holding protrusions 28 that protrude outward. With the holding protrusions 28 being fitted to temporary receiving holes 26 or permanent receiving holes 27, which will be described later, the slider 16 is held at a temporary holding position or a permanent holding position.

[Slider 16]

As illustrated in FIG. 2, the slider 16 has a rectangular tube shape that extends in the front-rear direction. The slider 16 is formed by pressing a metal sheet into a predetermined shape. The metal of which the slider 16 is made may be selected from any kinds of metal including copper, copper alloy, aluminum, aluminum alloy, and stainless steel where appropriate. The slider 16 in this embodiment is made of stainless steel; however, the metal is not limited thereto. Surfaces of the slider 16 may be plated. Metal used for plating may be selected from any kinds of metal including tin, nickel, and silver where appropriate.

A cross-sectional dimension of an inner shape of the slider 16 is about same as or greater than a cross-sectional dimension of an outer shape of a section of the terminal body 15 including the upper holding portion 18A and the lower holding portion 18B. According to such a configuration, the slider 16 is outside the section of the terminal body 15 including the upper holding portion 18A and the lower holding portion 18B.

As illustrated in FIG. 3, the slider 16 includes a lower pressing portion 25B (an example of a pressing portion) that protrudes upward from an upper surface of the bottom wall of the slider 16. The slider 16 includes an upper pressing portion 25A (an example of the pressing portion) that protrudes downward from the upper wall of the slider 16. The upper pressing portion 25A is below an upper wall 30 (an example of a wall) of the slider 16 and extends in a half area of the slider 16 ranging from the rear end of the slider 16 toward the front.

As illustrated in FIG. 2, a left sidewall 34 and a right sidewall 39 of the slider 16 include temporary receiving holes 26 at positions closer to the front edge in the front-rear direction. The left sidewall 34 and the right sidewall 29 of the slider 16 include permanent receiving holes 27 behind the temporary receiving holes 26. The holding protrusions 28 on a left wall and a right wall of the terminal body 15 can be elastically held in the temporary receiving holes 26 or the permanent receiving holes 27.

When the holding protrusions 28 of the terminal body 15 are held in the temporary receiving holes 26 of the slider 16, the slider 16 is held at a temporary holding position relative to the terminal body 15 (see FIG. 3). At this position, the upper pressing portion 25A and the lower pressing portion 25B of the slider 16 are separated rearward from the rear edges of the upper holding section 18A and the lower holding section 18B of the terminal body 15. Further, a gap between the upper holding section 18A and the lower holding section 18B is greater than the diameter of the core wire 13 (see FIG. 3).

When the holding protrusions 28 of the terminal body 15 are held in the permanent receiving holes 27 of the slider 16, the slider 16 is held at the permanent holding position relative to the terminal body 15. At this position, as illustrated in FIG. 1, the upper pressing portion 25A of the slider 16 contacts the upper holding section 18A from above. Further, the lower pressing portion 25B of the slider 16 contacts the lower holding section 18B from below.

As described above, while the slider 16 is fitted on the section of the terminal body 15 including the upper holding section 18A and the lower holding section 18B, the slider 16 is slidable between the temporary holding position and the permanent holding position.

As illustrated in FIG. 1, when the slider 16 is held at the permanent holding position relative to the terminal body 15, the upper pressing portion 25A presses the upper holding section 18A from above and thus the upper holding section 18A bends downward. Further, the lower pressing portion 25B presses the lower holding section 18B from below and thus the lower holding section 18B bends upward. When the core wire 13 is disposed in the gap between the upper holding section 18A and the lower holding section 18B to extend in the front-rear direction and the slider 16 is held at the permanent holding position relative to the terminal body 15, the core wire 13 is sandwiched between the upper holding section 18A and the lower holding section 18B that are bent in the top-bottom direction. Namely, the upper holding section 18A that is pressed downward by the upper pressing portion 25A contacts the core wire 13 from above and the lower holding section 18B that is pressed upward by the lower pressing portion 25B contacts the core wire 13 from below.

As illustrated in FIG. 1, when the slider 16 is held at the permanent holding position relative to the terminal body 15, the upper holding protrusion 23A of the upper holding section 18A presses the core wire 13 from above and the lower holding protrusion 23B of the lower holding section 18B presses the core wire 13 from below. The core wire 13 that is pressed by the upper holding protrusion 23A from above and by the lower holding protrusion 23B from below is bent in the top-bottom direction (an example of a direction crossing the extending direction) because the lower holding protrusion 23B is displaced from the upper holding protrusion 23A in the front-rear direction. With the upper holding protrusion 23A and the lower holding protrusion 23B, the core wire 13 is electrically connected to the terminal 12.

As illustrated in FIG. 2, the slider 16 includes two drawing sections 47 at a position closer to the rear edge of the slider 16. The drawing sections 47 protrude from the left sidewall 34 and the right sidewall 39 to an inner side of the slider 16. The drawing sections 47 have a width that decreases from the rear side to the front side. With the core wire 13 sliding on inner surfaces of the drawing sections 47, the core wire 13 is guided into the slider 16.

As illustrated in FIG. 3, the upper wall 30 of the slider 16 includes a front upper wall 30A and a rear upper wall 30B. The front upper wall 30A is on a front side with respect to a middle of the upper wall 30 and the rear upper wall 30B is on a rear side with respect to the middle and includes the upper pressing portion 25A.

The rear upper wall 30B extends leftward from an upper edge of the right sidewall 39 of the slider 16.

The front upper wall 30A extends rightward from an upper edge of the left sidewall 34 of the slider. A pressing portion 31 (one example of a wall) is disposed on the front upper wall 30A. The pressing portion 31 extends leftward from the upper edge of the right sidewall 39 of the slider 16. The upper wall 30 and the pressing portion 31 overlap in an overlapping area 32. As illustrated in FIG. 2, the pressing portion 31 has a rectangular shape seen from above. The pressing portion 31 includes a bent portion 33 in a rear end portion of the pressing portion 31 and the bent portion 33 extends downward from a left edge of the pressing portion 31. The bent portion 33 has a rectangular shape seen from the right-left direction.

As illustrated in FIG. 3, the pressing portion 31 includes a pressure receiving portion 46 in a rear end portion of the pressing portion 31. The pressure receiving portion 46 protrudes upward. The pressure receiving portion 46 is formed by bending the rear end portion of the pressing portion 31 upward in a mountain shape. With the pressure receiving portion 46 being pushed frontward, the slider 16 can slide frontward.

A structure of pushing the pressure receiving portion 46 is not particularly limited and a known jig 45 may be used for example. Instead of using the jig 45, an equipment including an actuator that presses the pressure receiving portion 46 may be used to press the pressure receiving portion 46.

The pressure receiving portion 46 is in a middle of the slider 16 in the front-rear direction. The pressure receiving portion 46 is adjacent to the upper pressing portion 25A. In detail, the pressure receiving portion 46 is in front of a front edge portion of the upper pressing portion 25A.

The left sidewall 34 of the slider 16 includes a support recess 35 on the upper edge of the left sidewall 34. The support recess 35 is recessed downward and corresponds to the bent portion 33. A front inner surface of the inner surface of the support recess 35 is a support portion 36. The support portion 36 contacts the bent portion 33 from a front side when the pressure receiving portion 46 of the pressing portion 31 is pressed from a rear side by the jig 45. The support portion 36 receives a force applied by the jig 45.

As illustrated in FIG. 2, the left sidewall 34 of the slider 16 includes an auxiliary support recess 37 on the upper edge of the left sidewall 34. The auxiliary support recess 37 is in front of the support portion 36 and is recessed downward. A recessed dimension of the auxiliary support recess 37 is about same as a thickness of the pressing portion 31 in the top-bottom direction. A front section of the inner surface of the auxiliary support recess 37 is an auxiliary support portion 38. The auxiliary support portion 38 receives a force applied by the jig 45 and transferred via the pressure receiving portion 46, the pressing portion 31, the bent portion 33 and the support portion 36. The depth of the auxiliary support recess 37 in the top-bottom direction is smaller than the depth of the support recess 35 in the top-bottom direction.

[Steps of Coupling Electric Wire 11 and Terminal 12]

Next, one example of steps of coupling the electric wire and the terminal 12 will be described. The steps of coupling the electric wire 11 and the terminal 12 are not limited to those described below.

The terminal body 15 and the slider 16 are prepared with a known method. The slider 16 is attached to the terminal body 15 from the rear. The front edge of the slider 16 contacts the holding protrusions 28 of the terminal body 15 from the rear and the sidewalls of the slider 16 deform to expand. When the slider 16 is pushed further forward, the sidewalls of the slider 16 recover. As a result, the holding protrusions 28 of the terminal body 15 are fitted in the temporary receiving holes 26 of the slider 16 and the slider 16 is held at the temporary holding position relative to the terminal body 15 (see FIG. 3). The terminal 12 is obtained.

The section of the core wire 13 of the electric wire 11 is exposed by striping the section of the insulating sheath with a known method.

With the electric wire 11 being pushed frontward from the rear of the slider 16, the front end portion of the core wire 13 is guided into the slider 16. With the core wire 13 contacting the drawing sections 47 of the slider 16, the core wire 13 is guided into the slider 16. When the core wire 13 is pushed further forward, the front end of the core wire 13 enters the inside of the terminal body 15 and reaches the gap between the upper holding section 18A and the lower holding section 18B.

When the slider 16 is held at the temporary holding position relative to the terminal body 15, the gap between the upper holding section 18A and the lower holding section 18B is greater than the outer diameter of the core wire 13.

Next, the jig 45 is brought into contact with the pressure receiving portion 46 from the rear to slide the slider 16 frontward. The slider 16 is slid frontward relative to the terminal body 15. The holding protrusions 28 of the terminal body 15 are released from the temporary receiving holes 26 of the slider 16. The sidewalls of the slider 16 slide on the holding protrusions 28 and thus the sidewalls of the slider 16 deform to expand.

When the slider 16 is moved forward, the sidewalls of the slider 16 recover and the holding protrusions 28 of the terminal body 15 are elastically fitted in the permanent receiving holes 27 of the slider 16. As a result, the slider 16 is held at the temporary holding position relative to the terminal body 15.

With the slider 16 held at the permanent holding position relative to the terminal body 15, the upper pressing portion 25A of the slider 16 contacts the upper holding section 18A of the terminal body 15 from above and presses the upper holding section 18A downward. The lower pressing portion 25B of the slider 16 contacts the lower holding section 18B of the terminal body 15 from below and presses the lower holding section 18B upward. Therefore, the core wire 13 is sandwiched between the upper holding section 18A and the lower holding section 18B in the top-bottom direction.

As illustrated in FIG. 1, the core wire 13 is sandwiched between the lower surface of the upper holding section 18A and the upper surface of the lower holding section 18B. The oxide film on the surface of the core wire is striped and a metal surface of the core wire 13 is exposed. With the metal surface contacting the upper holding section 18A and the lower holding section 18B, the electric wire 11 is electrically contacted to the terminal 12.

When the core wire 13 is sandwiched between the upper holding section 18A and the lower holding section 18B in the top-bottom direction, the core wire 13 is sandwiched between the upper holding protrusion 23A on the upper holding section 18A and the lower holding protrusion 23B on the lower holding section 18B. The core wire 13 is stretched in the front-rear direction and bent in the top-bottom direction. According to the configuration, the core wire 13 is firmly held and thus the electric wire 11 and the terminal 12 are held together with a greater force even when the electric wire 11 is pulled. The electric cable 10 including the terminal is complete.

Operation and Effects of this Embodiment

Next, operations and effects of this embodiment will be described. This embodiment includes the terminal 12 coupled to the front end of the electric wire 11. The terminal 12 includes the terminal body 15 and the slider 16. The terminal body 15 includes the upper holding section 18A and the lower holding section 18B that holds the core wire 13 of the electric wire 11. The slider 16 is movable in the front-rear direction between a first position and a second position that is in front of the first position while the slider 16 being fitted on the section of the terminal body 15 including the upper holding portion 18A and the lower holding portion 18B. The slider 16 includes the upper pressing portion 25A and the lower pressing portion 25B that press the upper holding section 18A and the lower holding section 18B toward the electric wire 11, respectively, when the slider 16 is at the second position. The slider 16 includes the pressure receiving portion 46. With the pressure receiving portion 46 being pushed from the rear side, the slider 16 can be moved from the first position to the second position. The slider includes the support portion 36 that receives a force applied when the pressure receiving portion 46 is pressed.

The electric cable 10 including the terminal according to this embodiment includes the terminal 12 and the electric wire 11 coupled to the terminal 12.

When a force is applied to the pressure receiving portion 46 by the jig 45 and the slider 16 moves from the first position to the second position, the upper holding section 18A and the lower holding section 18B are pressed by the upper pressing portion 25A and the lower pressing portion 25B, respectively, toward the core wire 13 of the electric wire 11. The upper holding section 18A and the lower holding section 18B are electrically connected to the core wire 13 of the electric wire 11 and the terminal 12 is electrically connected to the electric wire 11.

The support portion 36 receives the force that is applied to the pressure receiving portion 46 by the jig 45 when the pressure receiving portion 46 is pushed from the rear side by the jig 45. This suppresses the slider 16 from being deformed.

In this embodiment, the slider 16 includes the auxiliary support portion 38 that receives a force that the support portion 36 receives from the pressure receiving portion 46.

The force that is received by the support portion 36 is further received by the auxiliary support portion 38. This further suppresses the slider 16 from being deformed.

In this embodiment, the pressure receiving portion is in the middle of the slider 16 with respect to the front-rear direction.

If the pressure receiving portion 46 is on the front end portion or the rear end portion of the slider 16 and receives a force applied by the jig 45, the front end portion or the rear end portion of the slider 16 may be bent and lifted up. Since the pressure receiving portion 46 is in the middle of the slider 16 in the front-rear direction, the front end portion or the rear end portion of the slider 16 is less likely to be bent and lifted up.

In this embodiment, the slider 16 includes the overlapping area 32 in which the upper wall 30 and the pressing portion 31 of the slider 16 are disposed on top of each other. The pressure receiving portion 46 is behind the overlapping area 32.

Since the pressure receiving portion 46 is behind the overlapping area 32 in which the upper wall 30 and the pressing portion 31 overlap, the thickness of the upper wall and the pressing portion 31 that are in the overlapping area 32 can be used for a contact portion of the pressure receiving portion 46 that contacts the jig 45. This increases a contact area of the pressure receiving portion 46 and the jig 45 and improves work efficiency of pushing the slider 16 with the jig 45 contacting the pressure receiving portion 46.

In this embodiment, the pressure receiving portion 46 is adjacent to the upper pressing portion 25A.

The force applied to the pressure receiving portion 46 by the jig 45 is effectively transferred to the upper pressing portion 25A that is adjacent to the pressure receiving portion 46. The upper pressing portion 25A presses the upper holding section 18A effectively and this improves electric connection reliability between the upper holding section 18A and the electric wire 11.

Second Embodiment

Figure 4:
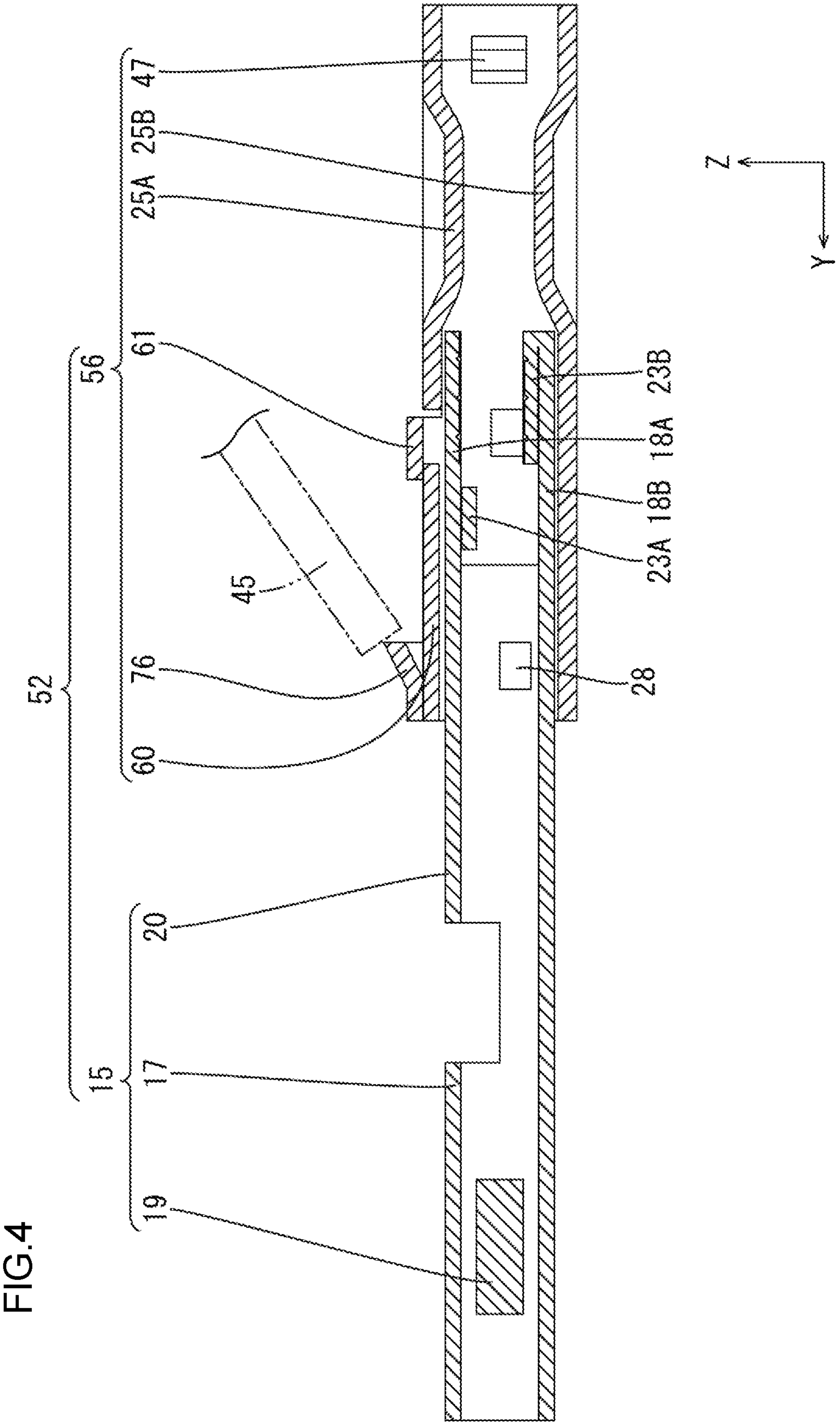
FIG. 4 is a cross-sectional view of a terminal according to a second embodiment.
Figure 5:
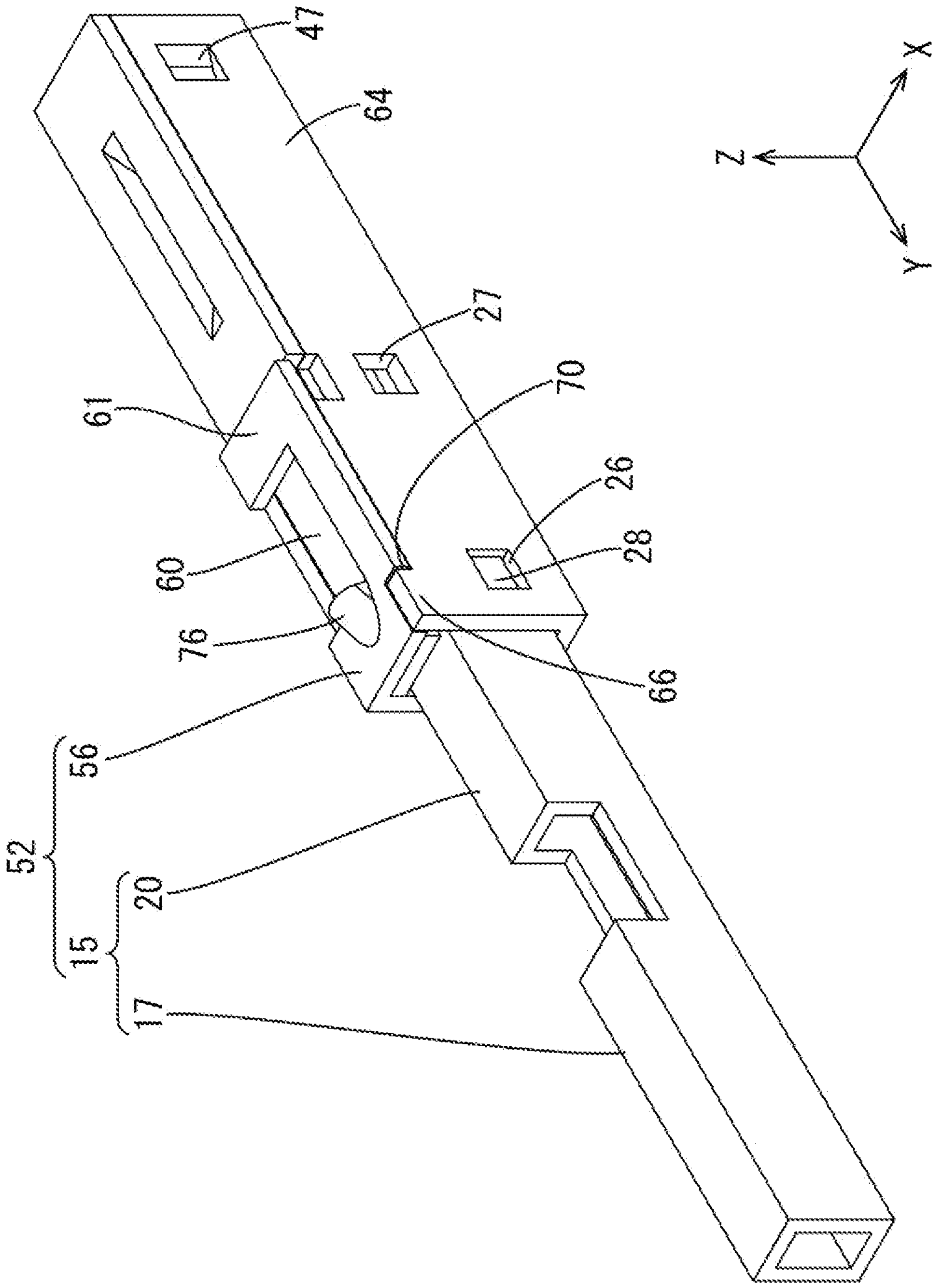
FIG. 5 is a perspective view of the terminal.

A terminal 52 according to a second embodiment of the present disclosure will be described with reference to FIGS. 4 and 5. As illustrated in FIG. 4, a slider 56 includes a pressing portion 61 on an upper wall 60. The pressing portion 61 is on a front side with respect to a middle of the slider 56 in the front-rear direction. As illustrated in FIG. 5, the pressing portion 61 has about a C-shape seen from above. The pressing portion 61 covers a front end portion of the upper wall 60, a middle section of the upper wall 60 in the front-rear direction, and a left edge portion of the upper wall 60 extending from the front end portion to the middle section in the front-rear direction. A left front corner of the pressing portion 61 is recessed and defined as a receiving recess 70 that receives a support portion 66, which will be described later.

As illustrated in FIG. 4, the pressing portion 61 includes a pressure receiving portion 76. The pressure receiving portion 76 is on a rear edge of a section of the pressing portion 61 that overlaps the front end portion of the upper wall 60. The pressure receiving portion 76 protrudes upward. The rear edge of the section of the pressing portion 61 that overlaps the front end portion of the upper wall 60 is curved to be in a mountain shape. The pressure receiving portion 76 having the mountain shape protruding upward is formed. The jig 45 is brought into contact with the pressure receiving portion 76 from the rear to push the slider 56 frontward and the slider 56 moves forward.

A left sidewall 64 on a left side of the slider 56 includes a support portion 66. The support portion 66 is on an upper edge of the left sidewall 64 and close to the front end portion of the slider 56. The support portion 66 is arranged in the receiving recess 70. The upper edge of the support portion 66 is on a same level as an upper surface of the pressing portion 61. The support portion 66 comes in contact with the pressing portion 61 from the front side when the pressure receiving portion 76 of the pressing portion 61 is pushed by the jig 45 from the rear side. The support portion 66 receives the force that is applied by the jig 45.

Other configurations are similar to the configurations of the first embodiment. Components of the second embodiment the same as the components of the first embodiment will be indicated by the reference signs that indicate the components of the first embodiment and will not be described.

In this embodiment, when the pressure receiving portion 76 is pressed by the jig 45 from the rear side (see FIG. 4), the force applied to the pressure receiving portion 76 by the jig 45 is received by the support portion 66 that comes in contact with the pressing portion 61 from the front side. This suppresses the slider 56 from being deformed.

OTHER EMBODIMENTS (1) A section of the slider including the pressure receiving portion is not particularly limited and the pressure receiving portion may be on a rear end portion of the slider.

(2) The terminal 12 may include only one holding section or three or more holding sections.

(3) Three or more walls may be overlapped with each other in the overlapping area 32.

(4) The holding protrusions 28, the temporary receiving holes 26, and the permanent receiving holes 27 may not be included.

EXPLANATION OF SYMBOLS

10: Electric cable including a terminal
11: Electric wire
12, 52: Terminal
13: Core wire
14: Insulating sheath
15: Terminal body
16, 56: Slider
17: Tubular portion
18A: Upper holding section
18B: Lower holding section
19: Elastic contact tab
20: Wire coupling portion
23A: Upper holding protrusion
23B: Lower holding protrusion
25A: Upper pressing portion
25B: Lower pressing portion
26: Temporary receiving hole
27: Permanent receiving hole
28: Holding protrusion
30, 60: Upper wall
30A: Front upper wall
30B: Rear upper wall
31, 61: Pressing portion
32: Overlapping area
33: Bent portion
34, 64: Left sidewall
35: Support recess
36, 66: Support portion
37: Auxiliary support recess
38: Auxiliary support portion
39: Right sidewall
45: Jig
46, 76: Pressure receiving portion
47: Drawing section
70: Receiving recess

The invention claimed is:

1. A terminal to be coupled to a front end portion of an electric wire that extends in a front-rear direction, the terminal comprising:

a terminal body including a holding section holding a core wire of the electric wire; and a slider fitted on a section of the terminal body including the holding section and being movable in the front-rear direction between a first position and a second position that is on a front side with respect to the first position, at least a section of the slider along the front-rear direction has a rectangular tube shape, the slider including a pressing portion that presses the holding section toward the electric wire when the slider is at the second position, a pressure receiving portion that is capable of being pushed from a rear side to move the slider from the first position to the second position, and a support portion that receives a first force from the pressure receiving portion when the pressure receiving portion is pushed.

2. The terminal according to claim 1, wherein the slider further includes an auxiliary support portion that receives a second force from the support portion when the support portion receives the first force.

3. The terminal according to claim 1, wherein the pressure receiving portion is in a middle of the slider with respect to the front-rear direction.

4. The terminal according to claim 1, wherein the slider includes walls, the walls include one wall including the pressure receiving portion and another wall that is disposed on the one wall in an overlapping area, and the pressure receiving portion is behind the overlapping area.

5. The terminal according to claim 1, wherein the pressure receiving portion is adjacent to the pressing portion.

6. An electric cable including a terminal comprising:

the terminal according to claim 1; and an electric wire coupled to the terminal.

* * * * *